United States Patent
Sanchez

(10) Patent No.: US 11,061,651 B2
(45) Date of Patent: *Jul. 13, 2021

(54) SYSTEMS AND METHODS FOR ORGANIZING, CLASSIFYING, AND DISCOVERING AUTOMATICALLY GENERATED COMPUTER SOFTWARE

(71) Applicant: Raul Sanchez, St. Louis, MO (US)

(72) Inventor: Raul Sanchez, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/868,309

(22) Filed: May 6, 2020

(65) Prior Publication Data

US 2020/0264851 A1     Aug. 20, 2020

Related U.S. Application Data

(63) Continuation of application No. 14/185,602, filed on Feb. 20, 2014, now Pat. No. 10,671,359.

(60) Provisional application No. 61/767,757, filed on Feb. 21, 2013.

(51) Int. Cl.
*G06F 8/38* (2018.01)
*G06F 8/36* (2018.01)

(52) U.S. Cl.
CPC . *G06F 8/38* (2013.01); *G06F 8/36* (2013.01)

(58) Field of Classification Search
CPC ..................................... G06F 8/36; G06F 8/38
See application file for complete search history.

(56) References Cited

U.S. PATENT DOCUMENTS

| | | | |
|---|---|---|---|
| 8,037,406 B1* | 10/2011 | Barnes | G06F 8/38 715/235 |
| 8,959,427 B1* | 2/2015 | Carlsson | G06F 16/958 715/236 |
| 2008/0295092 A1* | 11/2008 | Tan | G06Q 30/04 717/178 |
| 2009/0150541 A1* | 6/2009 | Georgis | G06F 9/451 709/224 |
| 2015/0266378 A1* | 9/2015 | Hwang | G06F 9/451 701/2 |
| 2016/0098172 A1* | 4/2016 | Bacinschi | G06F 8/38 715/747 |

* cited by examiner

*Primary Examiner* — Wei Y Zhen
*Assistant Examiner* — Amir Soltanzadeh
(74) *Attorney, Agent, or Firm* — Lewis Rice LLC

(57) ABSTRACT

A system and method for organizing and classifying existing applications so as to enable users to create new applications using the one or more parts of existing applications. The system is capable of automatically generating a large number of template applications which are fully designed, coded, and ready-to-use. The system also automatically expands its catalog of template applications and screen components, which are categorized based on a specified purpose, whenever a user creates a new application or screen with the same purpose. In this way a user can simply specify the purpose of what they want to create, and the system will provide a ranked list of possibilities based on the actions of other users, and automatic generation mechanisms.

14 Claims, 4 Drawing Sheets

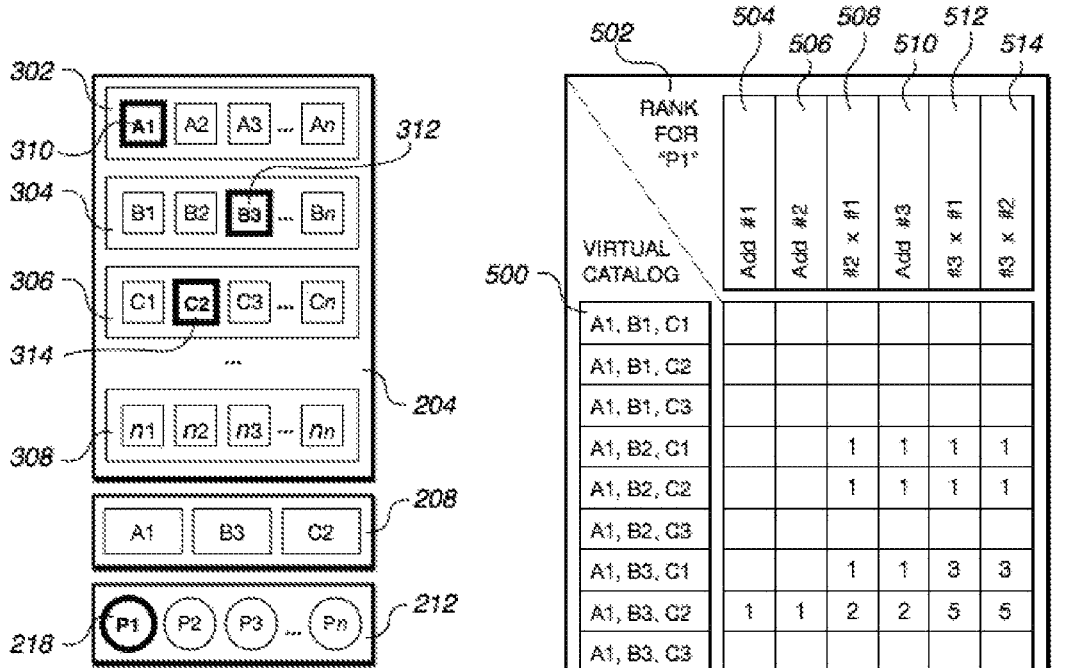
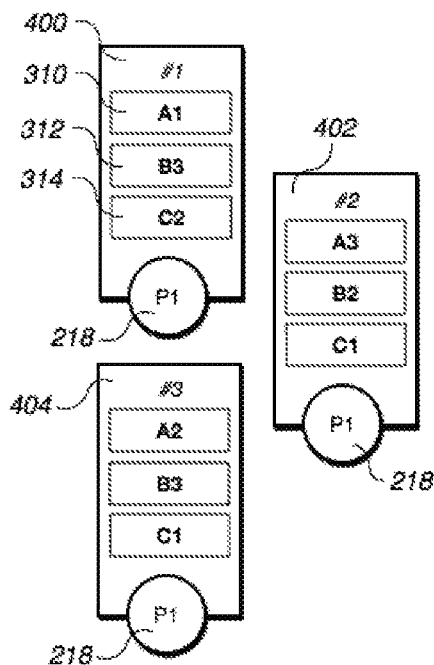
FIG. 3
FIG. 4
FIG. 5

SYSTEMS AND METHODS FOR ORGANIZING, CLASSIFYING, AND DISCOVERING AUTOMATICALLY GENERATED COMPUTER SOFTWARE

CROSS-REFERENCE TO RELATED APPLICATION(S)

This application is a continuation of U.S. patent application Ser. No. 14/185,602, filed Feb. 20, 2014, which claims the benefit of U.S. Provisional Patent Application No. 61/767,757 filed Feb. 21, 2013. The disclosures of both of these references are incorporated herein by reference in their entirety.

BACKGROUND OF THE INVENTION

1. Field of the Invention

The invention relates generally to the field of software development. More specifically, the invention relates to computer systems and computer implemented methods that organize and classify existing software and enable users to create new software applications using one or more parts of the existing software.

2. Description of the Related Art

Traditionally, the creation of computer applications involves the participation of multiple professionals. Developing a single application requires planning, design, prototyping, development, testing, and deployment. To build and deliver an application, it is required that one or many professionals follow a process that requires problem analysis, solution design, and application development. Although this process should lead to the creation of unique applications, applications that have the same purpose tend to look and behave alike. As a result, hundreds of design and development hours are wasted. A process that aims to produce unique software applications, ultimately ends up generating solutions that are only slightly different from other existing software product of the same purpose.

This problem has been identified by both companies and individuals. They have created software authoring tools that allow non-technical people to develop a software application, yet most software applications are developed by technical people. In this type of authoring tools the user interface is simplified to a point that all what users have to do is to create application interfaces by aggregating tiny elements such as texts, buttons, and images. Although these kinds of tools save a significant amount of time, compared to traditional development methodology, they also introduce new problems.

Specifically, these tools do not take into consideration that the user may have a clear vision of what he or she want to create, so even simple applications interfaces must be built by aggregation. Also, by oversimplifying the interface these authoring tools are less capable of solving real-world programming problems. These tools further do not offer the user ready-to-use design and code options, so the user does not have to reinvent the wheel when trying to address commonly known problems.

SUMMARY

A system and method for organizing and classifying existing applications so as to enable users to create new applications using the one or more parts of existing applications. The system is capable of automatically generating a large number of template applications which are fully designed, coded, and ready-to-use. The system also automatically expands its catalog of template applications and screen components, which are categorized based on a specified purpose, whenever a user creates a new application or screen with the same purpose. In this way a user can simply specify the purpose of what they want to create, and the system will provide a ranked list of possibilities based on the actions of other users, and automatic generation mechanisms.

There is described herein, among other things, is a method for generating a set of ranked screens, the method comprising: providing a database of screen seeds and parts accessible by a computer processor and a user, each screen seed being capable of having at least one part positioned on a position thereon; the user: selecting a screen seed from the database; populating the screen seed with parts from the database until all the positions have a part populated thereon; assigning the screen a screen purpose; and repeating the providing, selecting, populating and assigning to create a set of screens, each of the screens in the set having the screen seed and the screen purpose; the computer processor: accessing the set of screens and giving each of the screens in the set of screens a lowest ranking; making at least one new screen, each of the new screens comprising: the screen seed populated with an unused combination of parts which parts have been previously populated on at least one of the screens in the set of screens; associating each of the new screens with the screen purpose; increasing the ranking of the screens in the set of screens; giving each of the new screens a lowest ranking; merging the new screens into the set of screens; and storing the set of screens on the database.

In an embodiment, the method further comprises: the user making a first application, the first application comprising two or more screens from the database; and the user assigning the first application an application purpose.

In an embodiment, the method further comprises: a second user, the second user making a second application, the second application comprising two or more screens from the database; and the second user assigning the second application the application purpose.

In an embodiment, the method further comprises: the computer processor examining the first application and the second application and: if the first application and the second application include any screens with a common screen purpose, then creating a minimum screen requirement for the application purpose, the minimum screen requirement comprising all the common screen purposes between the first application and the second application.

In an embodiment, the method further comprises: the computer processor: generating at least one application template for the application purpose, the application template including at least one screen; wherein, the application template meets the minimum screen requirement for the application purpose.

In an embodiment of the method, the computer processor suggests to a third user, the third user indicating to the computer processor that they want an application for the application purpose, at least one of the application templates for the application purpose.

In an embodiment of the method, the application is designed to be rendered on a client device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 3 is a schematic illustrating a graphical interface for selecting and previewing combination of parts, and assigning a purpose thereto, according to an embodiment;

FIG. 4 is a schematic illustrating exemplary screen combinations that have the same purpose;

FIG. 5 is a schematic showing exemplary contents of a virtual catalog and the application of a ranking algorithm;

DETAILED DESCRIPTION

Figure 1:
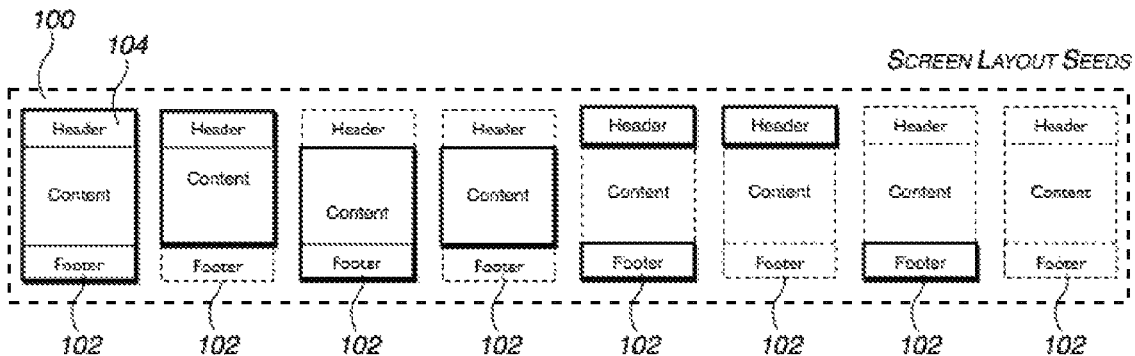
FIG. 1 is a schematic outlining various screen seeds that may be generated from a screen layout having three parts (i.e., a header part, a footer part, and a content part)

Embodiments of the present invention provide systems and methods for organizing and classifying existing software so as to enable users to create new software applications using the one or more parts of the existing software.

An embodiment of the proposed method makes a system capable of automatically generating millions of combinations of application screens and computer applications for known purposes. The generated screens and applications are fully designed, coded, and ready-to-use. Such an embodiment eliminates the need of long development processes; reduces the number of technical people required to build an application; and helps discover and evaluate hundreds of thousands of design variations so users can start creating applications with an end in mind.

Rather than providing a mechanism for users to create computer applications by typing source code, or aggregating small elements to build the required software interfaces, the proposed method and system offer a large catalog of pre-defined, fully designed, ready-to-use applications. The system also provides a mechanism for browsing and searching for screens and applications of known purposes. In this way the users can simply specify what is the purpose of the screen or application that the user want to create, and the system will provide a ranked list of possible screens and applications that can fulfill the specific purpose. Users can create duplicates of these screen applications to customize them and make them their own.

Key terms used in the detailed description are defined and described below.

Computer—this term refers to a machine, apparatus, or device that is capable of accepting and performing logic operations from software code. As will be appreciated by those skilled in the art, a computer may have a processor, transitory memory (e.g., Random Access Memory), non-transitory memory (e.g., a hard drive), input devices (e.g., a keyboard, fingerprint and/or retina scanner, a microphone), output devices (e.g., speakers, a display, a printer), et cetera. A computer may also be referred to herein as a system, such as a system 250 in FIG. 2.

Software, software code, computer software—these terms refer to any set of instructions operable to cause a computer to perform an operation. Software code may be operated on by a "rules engine" or processor. Thus, the methods and systems of the present invention may be performed by a computer based on instructions received by computer software.

Client device—this term, as used herein, denotes a type of computer which is operated by a person. Non-limiting examples of client devices may include personal computers (PCs), workstations, laptops, tablet PCs including the iPad™, cell phones including iPhones™ and android phones, or generally any electronic device capable of running computer software and displaying information to a user.

Data network—this term refers to an infrastructure capable of connecting two or more client devices either using wires or wirelessly allowing them to transmit and receive data. Non-limiting examples of data networks may include the internet or wireless cellular networks.

Database—this term refers to a digital collection of data or information. The present invention uses novel methods and processes to store, link, and modify information such as application information to be transmitted to a client device. For the purposes of the present disclosure, a database may be stored on a remote server and accessed by a client device through the internet (i.e., the database is in the cloud) or alternatively in some embodiments the database may be stored on the client device or remote computer itself (i.e., local storage on non-transitory memory).

Application—this term refers to an output of the system. An application is the combination of multiple screens that may be interconnected. Applications may be presented to users in the form of non-compiled or compiled data resources (i.e. files), that the users' devices are capable of rendering. Within the application, the end user can perform tasks that may involve retrieving information from a local or remote database, collecting information provided by the device hardware and sensors (i.e. camera, microphone, proximity sensor, motion sensor, ambient light sensor, gyroscope), collecting information provided by the user, storing the collected information, analyzing and processing the collected information, et cetera.

Application container—the system may provide one or more containers that allow for the grouping of the multiple screens that may be part of an application, which containers are referred to herein as application containers. An application container may handle rules for aggregating screens and the resources associated with those screens. The application container may serve as a mediator between the application screen and the devices where the application might be running, to allow the screens accessing the devices' software and hardware resource.

Application combination—this term refers to a concrete combination of multiple application screens (defined further below). The system may provide users with a graphical interface to aggregate one or more screens into a single group. An application combination might be made out one or more screens.

Application purpose—this term refers to the concrete use that a user may assign to an application. A single application may have one or more purposes. This concept also refer to the primary function perform by the application combination. For instance if the purpose of an application combination is "real estate", individual screens of the application combination may perform the tasks of "displaying houses in a map" or "showing details of a single home". In this scenario the main purpose of the application is still "real estate" and that is what the system may capture as application purpose.

Application instance—the system may allow users to create copies of applications that have been added to the system, and an application instance is an editable copy of an application that the users can customize and assign user specific text, images, video, audio, design style, and functionality.

Application data—the system may collect or aggregate information that relates to each application or application instance, and this application data may include but it is not limited to, application globally unique identifier (GUID), application purpose, application friendly name, tags, categories, date of creation, date of last modification, metadata, et cetera.

Initial set of applications—the system may provide a graphical user interface for users to browse all available applications within the system and applications available in the system prior to any user interaction are considered the initial set of applications of the system.

Figure 6:
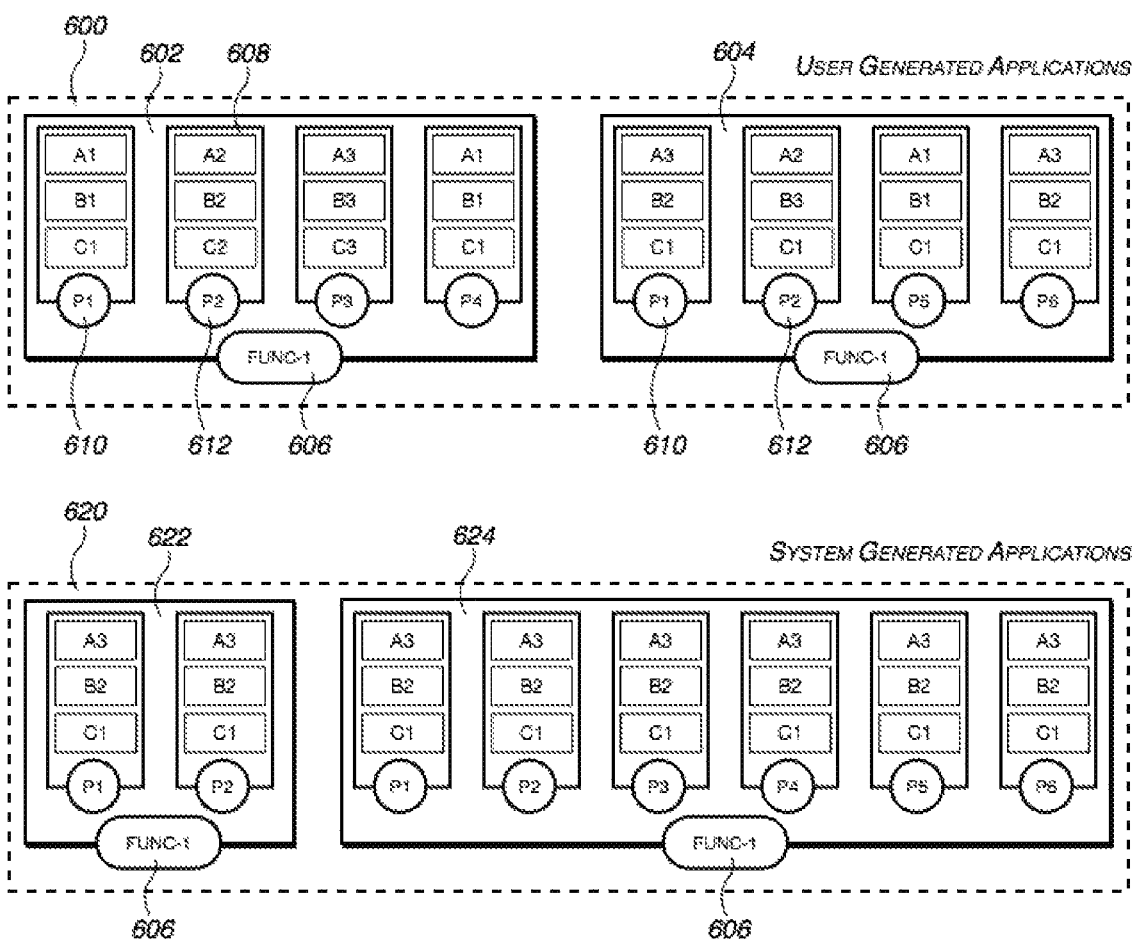
FIG. 6 is a schematic illustrating exemplary user generated and system generated applications, according to an embodiment.

Application minimum screen set—the system may allow the user to assign a purpose to an application combination. Once the system detects two or more application combinations with the same purpose, the system can identify which screens within the applications of the same purpose, have the same screen purpose. The application minimum screen set refers to the group of screens of similar screen purpose that are found across applications combination that have the same application purpose. FIG. 6 illustrates this concept, as described in more detail herein.

Application full feature set—when the system finds application combinations of the same purpose, the group of screens that are common and not common across all the applications of the same application purpose, makes up the maximum possible group of screens that can be used to build an application that contains all the features that may be consider for a single application with that application purpose. This group of screens is considered to be the application full feature set. FIG. 6 illustrates this concept, as described in more detail herein.

Screens or screen—this term represents a single state of the application, i.e., what the user sees any given moment. Information inside the application may be presented to users in one or more screens. Each of these screens renders graphic elements that communicate to the user the information available in the application. This information may be, but is not limited to, images, text, animations, videos, and interactive visual elements. A screen may also present the user with graphic elements that will help capture data from the user or interact with the client device's software and hardware.

Screen data—the system may collect or aggregate information that relates to each application screens, and this information may include but it is not limited to, screen globally unique identifier (GUID), screen purpose, screen friendly name, tags, categories, date of creation, date of last modification, metadata.

Screen layout—this term refers to the way in which graphic elements are arranged, positioned, sized, and displayed within the screen that is displayed on a client device. Within the system screens may be constructed using "parts". In some embodiments, parts include, but not limited to, header area, content area, and footer area. A possible screen layout might be a column where the header, content, and footer areas are stacked vertically, filling out the entire screen. FIG. 4 shows some possible embodiments with various layout alternatives.

Screen seeds—within a screen layout, the different parts that comprise a screen might or might not be visible within the screen; for example, in some embodiments, the value of a header or footer may be set to none so that it is not ultimately displayed or rendered to an end user. All the combinations resulting from creating variations of a single layout, by showing or hiding each part of the layout, are considered seeds. For example, a screen layout containing parts such as header, content, and footer, generates 8 possible screen seeds. This number can be determined by using 2 values for each of the parts (visible and not visible), and multiplying that value by itself for as many time as parts are in the layout (2*2*2=8). FIG. 1 shows an example of screen seeds for a three part screen layout (header, content, footer).

Screen purpose—this is the intended use that a user may assign to a screen. A single screen may have one or more purposes. This concept also refer to the primary function performed by the screen. In some embodiments for example, a screen may have purposes such as, but not limited to, contact form, list of items, photo gallery, map, and item details.

Related screens—within an application, screens may link to each other. In such cases, the system considers those interconnected screens as related. The system may keep track of the interconnected screens, in order to make recommendations to the user about which screens may be combined when the user creates new applications.

Initial set of screens—the system may provide a graphical user interface for users to browse all available screens within the system. Screens available in the system prior to any user interaction are considered the initial set of screens of the system.

Parts—for the purpose of this system, a part comprises the combination of visual elements within a screen, computer code, local or remote file resources, and data that might be stored within the system or a remote location. For example, FIG. 1 shows a screen made of three parts 104, i.e., a header area, a content area, and a footer area. These areas are considered parts 104. The system may store one or more sample of each part 104. The system may also allow users to create screens by combining samples of parts 104 available within the system.

Part data—the system may collect or aggregate information that relates to each part. This information may include but it is not limited to, part globally unique identifier (GUID), part purpose, part friendly name, tags, categories, date of creation, date of last modification, metadata.

Part dependencies—the system may also store computer code that may be associated with each part sample. Possible embodiments of a part dependencies may include but is not limited to, computer code of the type HTML, CSS, Javascript, PHP, Ruby, Python, CSV, JSON, Objective-C, Java, .NET, and XML amongst many others popular programming languages. Part dependencies may also refer to the associated binary code such as, but not limited to, images, animated images, video files, audio files, computer animations, portable document format (PDF), spreadsheets, archive files (ZIP, GZ, RAR, TAR, etc). A part dependency may also be expressed in the form remote data that can be access via protocol such as, but not limited to, RESTFul or web API, SOAP, XML/HTML, or direct or indirect access to the client device's APIs that are available to application.

Part preview—parts may include as part dependencies one or more images that represent the final look-and-feel of the specific part sample.

Initial set of parts—the system may provide a graphical user interface for users to browse all available parts within the system. Parts available in the system prior to any user interaction are considered the initial set of parts of the system.

Elements—this term refers to any portion of the screen that renders data such as, but not limited to, text, images, or video, should be consider an element. Any portion of the screen that is used to group text, images, video, or a combination of any number of these elements, should be considered an element. Any portion of the screen that allow users to provide input to the application in the form of text, voice command, mouse click, screen tap or touch, should be considered an element. The grouping of one or more elements makes up a part.

Source code—this refers to a collection of human-readable computer instructions that the system may use to represent elements, parts, screens, and applications. Within the system, components and components relationships may be expressed in the form of source code. The system may allow user to add, delete, or modify source code.

Virtual catalog or application database—for a given semen layout, and given number of parts compatible with that screen layout, the system can automatically generate all the possible screens combinations that may result from permuting parts within the layout. For example, in some embodiments, a screen layout might be made out of a header area, content area, and footer area. In a scenario where there are 10 available part samples for each of the screen layout areas (header, content, and footer), the system may generate a catalog of screens with 1000 screen combinations. The virtual catalog represents the maximum number of unique screen combinations that can be generated using the available parts. The addition of new parts to the system will exponentially increase the number of screens inside the virtual catalog 500. Similarly, the addition of new screen layouts will also increase the total number of possible screen combinations. FIG. 5 shows schematics of a possible virtual catalog that results from a 3 parts layout (header, content, footer), and uses 3 samples for each part to generate a virtual catalog of 27 possible screen combinations.

User—a person or an external system that can make use of the proposed invention. A user may have one or more roles within the system and such roles may define what the user can or cannot do.

User data—the system may collect or aggregate information that relates to each user. This information may include but it is not limited to, user globally unique identifier (GUID), email addresses, roles, related website URLs, username, categories, date of creation, date of last modification, system usage logs.

System Intelligence—this refers to the ability of the system of capturing, tracking, and computing users inputs. Users' input might be, but are not limited to: the creation, editing, or deletion of parts, screens, or application (System Components); assigning purpose to System Components; naming or tagging System Components; terms use to search System Components within the system; explicit ranking of a System Components; and linking screens within an application. System intelligence also refers to: the system's ability to make recommendations to a user when he or she is creating a part, screen, or application; the ability of displaying and sorting information using data that might be relevant to an individual user such as, but not limited to, previous searches, previously used System Components, related System Components; the system's ability to analyze user generated content such as, but not limited to, parts, screens, and applications, and compare those types content against the system's database 252 to assess if the content is significantly different from the copies in the system, that originated that content. In such cases, the intelligence built into the system may import the new parts, screens, or application variations into the database and make them part of the system's initial catalogs.

Attention is directed now to the Figures. FIG. 1 shows a schematic of an example of a basic screen layout 100 made out of 3 parts 104 (header, content, and footer). By displaying or hiding the areas of the layout, the system can determine what is the number of screen variations 102 that can be generated for a given screen layout. This number is the result of using 2 values for each of the parts (visible and not visible), and multiplying that value by itself for as many time as parts are in the layout. For example, in FIG. 1, the number of screen variations 102 that can be generated from this 3 part layout is 8 (2*2*2=8). While FIG. 1 shows a possible embodiment of screen seeds for a three parts screen layout (header, content, footer), people of skill in the art will readily appreciate that layouts made out of a larger number of parts may be used and that they will produce a larger number of screen variations 102.

Figure 2:
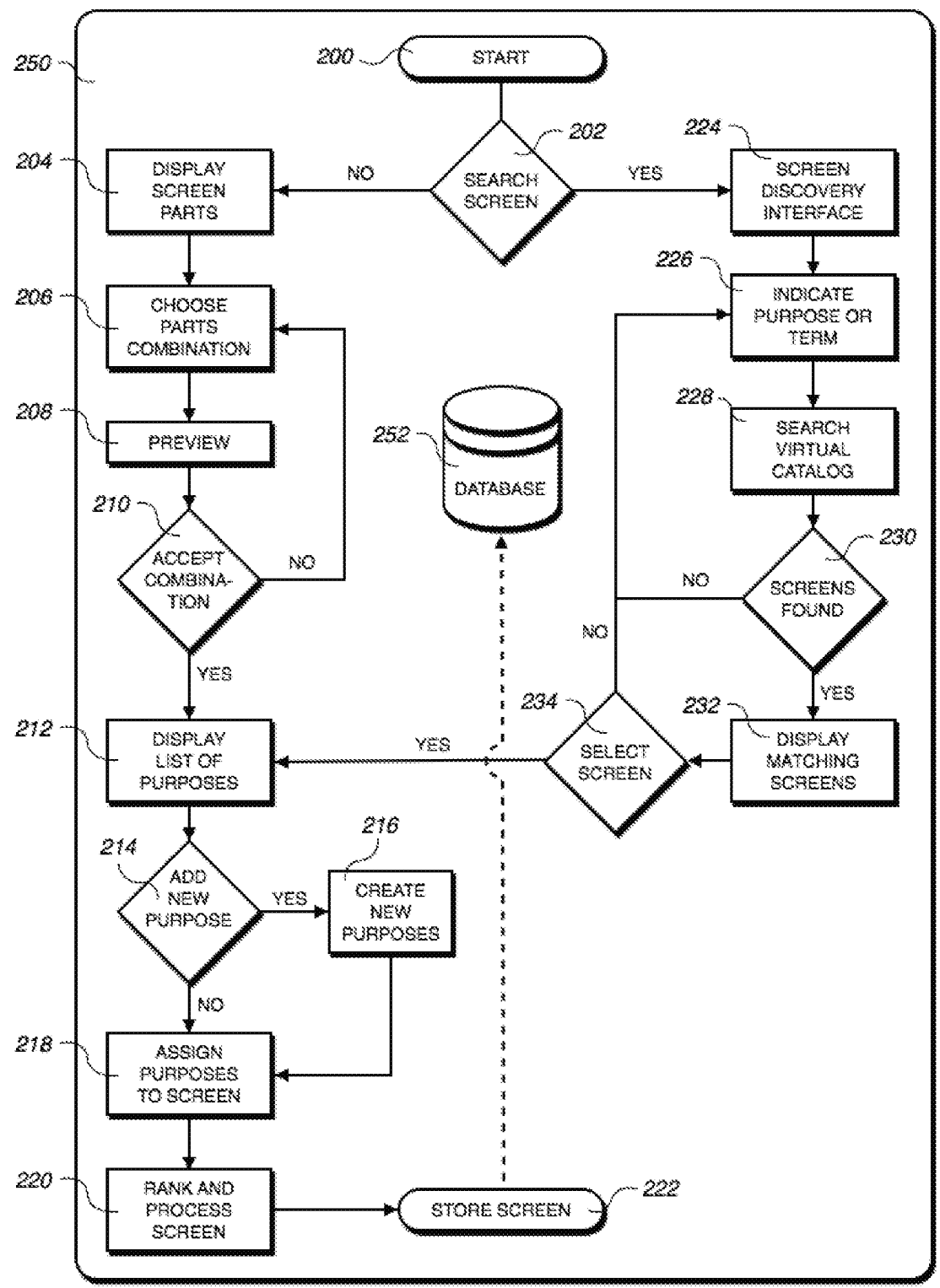
FIG. 2 is a flowchart illustrating the workings of a system for organizing, classifying and generating software, according to an embodiment.

FIG. 2 shows a method 201 of using the system 250 for the creation of new application screens. The method 201 may begin at step 200, and at step 202, the user may be able to choose between: (i) searching for an existing application screen; or (ii) create his or her own application screen combination. If the user chooses to create a new application screen, the system 250 at step 204 may present a graphic interface that displays the different parts 104. From the parts user interface, at step 206, the user may choose a combination of parts that together will make up an application screen. FIG. 4, for example, shows three possible combinations of application screens 400, 402, 404.

At step 208, the system 250 may present the user with a graphical interface to preview the combinations of the chosen parts in real time. Once the user is satisfied with the chosen combination, the system 250 may prompt the user to accept the combination at step 210.

If the part combination is accepted by the user at step 210, the system 250 may display a graphic interface with a suggested list of screen purposes at step 212. A screen combination may be associated with one or more purposes. Users may use the system 250 to add new purposes at step 214 if the desired screen purpose is not part of the suggested list of purposes. If the user chooses to add a new screen purpose via the system 250 at step 214, he or she may be presented with a graphical interface at step 216 to add the new purpose. The system 250 may automatically associate the new purpose to the screen combination at step 218. If the user chooses a screen purpose from the purpose list at step 212, the selected purpose will be associated to the screen combination at step 210.

Once a screen combination has been accepted at step 210, and a purpose has been assigned at step 218, the system 250 may inspect the virtual screen catalog 500 and rank the screen combination at step 220. The system 250 may perform additional processing at step 220, such as processing that involves comparing the screen combination with purpose to other screens that may have the same purpose. After the screen combination has been ranked, the system 250 may store the screen association under the user's profile at step 222.

Alternatively. or in addition, the system 250 may present the user with a graphic interface to search or browse for existing screens at step 202. Specifically, the system 250 may present a graphic interface for the user at step 224, and instruct the user to specify the purpose of the screen he or she is looking for at step 226. Alternatively, the user may also specify terms of keywords to discover application screens at this step 226. Terms or keywords may include but are not limited to, screen names, categories, descriptions, tags, metadata, file resource names, or any other data associated with the screen within the system 250. Using the purpose, term, or a combination of both, the system 250 may inspect at step 228 the virtual catalog 500 to find application screens or part combinations with similar purpose, or that contain similar terms.

If, however, no matches are found at step 230, the system 250 may present the user with additional recommendations, or loop back to step 226 where the graphic interface may allow the user to indicate a different purpose or term. If the system 250 finds other screens within the virtual catalog 500 that match the purpose or term at step 230, the user may be presented with a graphic interface that will display a list of matching screens at step 232 organized by, but not limited to, ranking, alphabetical, date of creation, popularity, and other information related to the screens that is managed by the system 250.

The user may create a new screen from an existing one, by selecting a screen from the list of screens that matched the previously indicated purpose or term at step 234. The system 250 may allow the user to specify a new purpose or term at step 214 to the selected screen. The user may also choose to re-assign the same purpose to the screen selected at step 234. Once the user assigns a purpose, the system 250 may rank and process the screens against other screens previously created within the system 500 at step 220, as discussed above and in more detail below. Finally, the screen may be store and associated with the user's profile at step 222.

FIG. 3 shows schematics of an example of a parts selector graphic interface (as at step 204 of the method 201), the parts preview step (i.e., step 208 of the method 201), and the displaying of the purpose list (as at step 212 of the method 201). Within the parts selector graphic interface, the system 250 may group parts of the same type or kind inside a group, such as groups 302, 304, 306, and 308 in FIG. 3. In the schematic at FIG. 3, the part group 302 may represent a screen header area, the part group 304 may represent the screen content area, and the part group 306 may represent the screen footer area. The database 252 does not limit the number of part groups that can be displayed to the user from a graphical interface. When a user selects parts from the available part groups (310, 312, 314), the selected parts combination is displayed in the preview area (as at step 208 of the method 201). In the preview area, the system 250 may present to the user with an interactive representation of the final assembled screen that contains the selected parts (310, 312, 314, in this example). FIG. 3 also shows schematics of the list of screen purposes 212. Before a user can store a screen combination in the system, he or she may associate the screen combination (310, 312, 314) with an specific purpose P1 (as at step 218 of the method 201).

FIG. 4 shows schematics of possible screen combinations 400, 402, 404 that may be created using the parts selector graphical interface (as at step 204 of the method 201). Along with the different parts 310, 312, 314, each screen is associated with at least one screen purpose. In FIG. 4 the screen #1 400, #2 402, and #3 404, have the same screen purpose P1.

FIG. 5 shows a combination of the virtual catalog (or application database) 500 and a screen ranking table 502. The virtual catalog 500 shows all possible screen combinations according with the parts shown in FIG. 3. The ranking table 502 shows a simulation of how the screens with the same purpose P1 will rank as new application screens are added to the system 250. When the screen #1 400 is added to the database 500, the system 250 may assign to it a ranking unit 516; when the screen #2 402 is added to the database 500, the screen #2 may also be assigned the ranking unit 516. Once the system 250 detects two or more screens of the same purpose P1, the system 250 may generate a subset of screen combinations within the virtual catalog 500 by permuting the different parts of the screens of the same purpose stored P1 within the system. By processing screen #1 400 and #2 402, the system 250 may be capable of identifying screens within the virtual catalog 500 that might serve the same purpose P1. Each of the screens within the subset may get a ranking unit. The final ranking after processing screen #1 and screen #2 (as in column 508 of the table 502), shows that the originally added screens rank higher. As more screens with the same purpose P1 are added to the system, the subset of screens that can serve the same purpose is larger. After processing the screen #3 against screen #1 (as at column 512) and screen #2 (as at column 524), the system 250 may be capable of identifying screens that have higher probability of serving the same purpose P1, even if the screen combination was not originally generated by the end user.

FIG. 6 shows schematics 600, 620 of user generated and system generated applications, respectively. The applications 602 and 604 in the schematic 600 may have the same application purpose 606, and contain multiple screens 608. In these schematics, the screens with purpose P1 (610), and purpose P2 (612), are common amongst the 2 user generated applications. When 2 or more applications of the same purpose are added to the database 252, the system 250 may determine what is the minimum number of screens and their purposes that are required to generate applications of the same application purpose 606.

The applications 622 and 624 in the schematic 620 are system generated applications. Both have the same application purpose 606 as the applications 602 and 604. The application 622 is the result of analyzing user generated applications of the same purpose 606, and extracting the screens that are common amongst those applications 602, 604. The application 624 is the result of aggregating common and non-common screens from user generated applications of the same purpose 602, 604.

Thus, as can be appreciated, the present invention relates to a systems and computer implemented methods to generate, classify, and discover computer applications for a given purpose. An application purpose P refers to the concrete use that the user may give to the computer application or computer application screen. Users of the system 250 can create, edit, classify, and delete system components such as parts, screens, layouts, and applications. To manipulate these components the system may present the user with graphical interfaces where the user can search, browse, select, name, tag, create, duplicate, alter, remove, archive, combine, compile, and export system components. Further, within the system 250, users can:

Authenticate: using login credential a user may access information that is available to all users as well as user-specific information such as settings, application and screen instances, resources, profile data, historical application performance and analytics.

Browse or search database 252: the database 252 contains initial sets of parts 104, screens, and applications that are made available to all users. The system 250 may present users with a graphical interface on a client device to browse and search information such as parts 104, and screens from the virtual catalog 500 (as at step 224 of the method 201), and applications within the system. The system 250 may also provide additional graphical interfaces for the user to inspect applications and their respective resources (i.e. related source code, data, or images). These graphical interfaces may allow users to perform advance discovery of system component. The advanced interface may allow filtering search result using components name, description, date of creation, tags, resource, group name, and purpose. In some embodiments, when searching or browsing using the component purpose, the list of component will include user generated and system generated components.

View global search results: the system 250 may present users with a graphical interfaces that display lists of parts, screens (such as at step 232 of the method 201), applications, or resources that are the result of a browse or search action. The user may inspect, preview, utilize, or duplicate one or more components from the result list.

Create new screens: the system may present a user with an interface containing collections of parts that are grouped by similarity (as at step 204 of the method 201). Parts that perform similar functions, or which may be required to be located in the similar areas within the screen layout, are grouped together for easy selection and discovery (such as parts 302, 304, 306 in FIG. 3). The user can select one or more parts from each collection (such as from groups 310, 312, 314 in FIG. 3). As the user selects parts 104, the system 250 may show a real time preview (as at step 208 of the method 201) of all the parts combine in the form of a single application screen (FIG. 4 shows schematics of possible parts combinations). Once the user is satisfied with his or her selections, the user may assign a purpose P and a custom name to the combination (as at step 218 of the method 201). The combination will be associated to the user's profile along with the custom screen name (as at step 222 of the method 201). The user may also tag the created screens. User tags may be used by the system to determine similarities between screens and allow the user to browse for screens (as at step 224 of the method 201).

Specify the purpose of a screen: once the user has created a screen combination, the system 250 may present the user with a graphical interface listing possible purposes P (e.g., P1, P2, P3, et cetera) or usages for an application screen. The user can select a purpose from the list and associate that purpose with the screen (as at step 218 of the method 201). The system 250 may check for screens with the same purpose P that have been previously created by users, and automatically identify screens within the virtual catalog 500 that can be used for the same purpose.

Tag screens: similarly to specifying the purpose P of a screen, the system 250 may present the user with a graphical interface where the user can select tags from a list of predefined tags, and associate the selected tag with a screen. If the desire tag does not exist, the system may present the user with a graphical interface to allow the user to suggest a new tag, and add that tag to the database 252. The system will maintain an association between the screen, the user, and the tag, to allow the user to discover screens using tag names.

Rank screens: when a user creates a screen, the system 250 may collect information about the parts used by the user to create that screen, tags applied to screens, and the purpose P of each screen, and combine that data with similar information acquired from other screens. Using this information, the system may automatically identify screens of the same purpose within the virtual catalog 500. In FIG. 5, ranking table 502 shows a ranking process followed by the system 250 in some embodiments. In some embodiments, every time that a user creates a new screen, the system 250 may automatically assign a rank unit to that screen combination within the virtual catalog 500. A rank unit is generally a number assigned by the system and associated with an element of the system such as a screen. In addition to this, the system will inspect the virtual catalog 500 looking for user generated screens with the same purpose. If any screen is found, the system may run permutations between the parts of the newly created screen and the parts of any existing user generated screen of the same purpose (e.g., as shown in columns 508, 512, 514 of FIG. 5). Any screen combination that is discovered during the permutation process will be ranked. The permutation of the user generated screens of the same purpose P (e.g., purpose P1 in FIG. 5), allows the system 250 to automatically identify a subset of screens that can server the same purpose. As a result of using this method, the system 250 may be able to identify and rank a subset of screens within the virtual catalog 500, that can be used for the same purpose P for which they were ranked. Screens that rank higher (i.e. have a higher rank value) are those that both, the users and the system, have identified as good combination for a given purpose P. The system 250 may provide additional graphical interfaces for the user to assign positive or negative rank to increase or decrease the rank value. In such cases, the total rank value of the screen combination rank 516, within the virtual catalog 500 may decrease by one or more rank units. A higher rank value might be evidence that the screen combination is more suitable for the purpose for which the screen was ranked. Some embodiments of the system 250 may present the user with a graphical interface to discover application screens within the virtual catalog, using a screen purpose 218. The system 250 may choose to return the list of matching screens ordered by the screen rank value in an ascending or descending way.

Rank unit: the ranking process involves increasing or decreasing the rank of a screen by a numeric value. The system 250 considers this numeric value the rank unit. Some embodiments of the system may choose to represent this number with the integer one (1). During the ranking process a screen may be ranked with one or more rank units.

Browse and search applications: in some embodiments, the system 250 may present users with a graphical interface to browse and search applications. The system 250 may present the user with additional graphical interface to perform advance discovery of applications. The advanced interface may allow filtering search result using, for example, application name, tags, and purpose. When searching or browsing using the application purpose, the list of screen may include user generated and system generated applications.

View application search results: the system 250 may present users with a graphical interfaces that displays lists of applications that are the result of a browse or search action. The user may inspect, preview, utilize, or duplicate one or more applications from the result list.

Create a new application: the system may present a graphical interface for the user to combine one, two or more screens into an application template. To store an application within the database 252, the user may have to assign a name, and a purpose to the created application. The system will maintain a data relationship between the combination of screens, the user, the application purpose, and any additional data provided by the user in regards to the newly created application. The system 250 may use this information to allow the user browse and search applications stored within the database 250.

Specify the purpose of an application: once the user has created an application, the system 250 may present the user with a graphical interface listing possible purposes or usages for an application. The user can select a purpose from the list and associate that purpose with the application. The system 250 may check for applications with the same purpose P that have been previously created by users, and automatically identify what is the minimum set of screens that are required to create applications of the same purpose, and what is the maximum set of screens that will correspond to an application with all the possible screens required for that application purpose. The minimum and the maximum sets of screens will be stored in the database 252 in the system 250. The system 250 may use this information to allow the user to browse and search applications of that purpose that has been automatically generated.

Tag an application: similar to specifying the purpose of an application, the system may present the user with a graphical interface where the user can select tags from a list of predefined tags, and associate the selected tag with an application. If the desire tag does not exist, the system 250 may present the user with a graphical interface to allow the user to suggest a new tag, and add that tag to the catalog 252. In some embodiments, the system 250 may maintain an association between the application, the user, and the tag, to allow the user to discover applications using tag names.

Auto-generate applications: FIG. 6 shows how the system 250 can automatically generate applications from user generated applications. When a user creates an application (e.g., Applications 602, 604 in FIG. 6), the system 250 automatically inspects the database 252 and looks for other user generated applications of the same purpose P (e.g., purpose P1 at 610 in FIG. 6). If other applications are found, the system 250 may automatically identify combinations of screens that may produce applications of the same purpose. As can be seen in FIG. 6, both user generated applications 602, 604 contain variations of screens with the purpose P1 at 610, and P2 at 612. Once the user adds to the applications database 252, an application combination that has the same application purpose 606 of previously added application combinations, the system 250 can compare all user generated application combinations of that purpose 606, and determines how often an single screen purpose appear across all user generated applications of the same purpose 606. If some screens of particular screen purposes are frequently used, the system 250 can safely assume that possible embodiments of a new application 622 for the application purpose 606, should include screens of the screen purposes 610, 612, that are commonly used in user generated applications of the same application purpose 606. In FIG. 6, application 622 show a possible embodiment of a system generated application combination. This is the result of identifying screens with the purposes P1 and P2 (610 and 612 respectively), that are present in user generated applications of the same application purpose. The embodiment 622 is then, a system generated application that aggregates only screens with screen purposes 610, 612 that are frequently used across user generated applications of the purpose 606. Similarly, the system can perform additional processes to analyze newly added user generated application, and identify screens of the same screen purpose P1, P2 (610 and 612 respectively) that are frequently used across all user generated applications of the same purpose 606, and screens of different purpose that are use across the same group of user generated applications. Application 624 shows a possible embodiment of a system generated application of the purpose 606, that is the result of combining a single instance of every screens purposes, used in user generated applications of the purpose 606. To automatically generate a system application combination, the system 250 may use screen combinations created by the user, as well as screens of the correspondent purposes that might be available in the virtual catalog 500. The application combinations that result from these permutations will be stored in the database 252 in the system 250, and associated with the application purpose 606 for which the permutations were done.

Rank applications: all applications within the system 250 are ranked. For example, if a user creates an application with a purpose 606, that application gets a rank unit. A rank unit might be assign to an application combination in situation such as, but not limited to: the user generates an application; the system 250 auto-generates an application combination; and the user creates copies of an application.

Browse and search applications: some embodiments of the system 250 may present the user with a graphical interface to discover applications using a known (i.e. a preset) application purpose 606. The system 250 may present the user with additional graphical interface to perform advance discovery of applications. The advanced interface may allow filtering search result using application name, tags, and purpose. When searching or browsing using the application purpose, the list of applications will include user generated and system generated applications. The system 250 may choose to return the list of matching application ordered by the application rank value in an ascending or descending way.

View applications search results: the system 250 may display a list of applications in a graphical interface when users browse or search for applications. The user may inspect, preview, utilize, or duplicate one or more applications from the search result list.

Create an application instance: the system 250 may allow users to create instances of applications. The system 250 may present the user with a graphical interfaces to find and select application and create duplicates of one or more application that can be edited.

Edit application instances: the system 250 may allow user to edit the source code and resources of an application instance. The system 250 may provide users with a graphical interface to add, remove, or modify resources and source code of an application instance.

Analyze application instances to create new parts 104: the system 250 may inspect user generated application instances. The system may compare the different parts 104 of any application instance against the initial set of parts within the system 250 (as at step 204 of the method 201). When the user edits an application instance it is expected that the parts within that application instance will differ from the parts from which they were originated. If the application instance parts are considerably different, the system 250 may identify and replace the user's custom information such as, but not limited to text labels, text paragraphs, and images, and import the processed part into the initial set of parts.

Publish applications: the system 250 may export parts, screens, and applications in the forms of: uncompressed code to be consumed by client devices that are capable of rendering web content (HTML, CSS, Javascript, text, images and media files)—the uncompressed version may be accessed from the system or from an external system. The system is also capable of transferring the web content to a remote server using protocols such as FTP, SFTP, SSH, HTTP, HTTPs, MLLP, OFTP, OFTP2, RNIF, SMTP, SMTPs, WS; archive files to allow the download of the parts, screens, or application and their related source code and resources; and compile the application as a package to allow installations in client's devices as native code.

Thus, as has been described, the system 250 may organize and classify automatically generated computer applications, and can automatically generate millions of computer application screens without human intervention. By breaking application screens into combinable parts 310, 312, 314, the system 250 can perform permutation to generate the required visual, logical, and data elements that comprise each application screens.

Further, the system 250 may automatically generate millions of computer applications without human intervention. Applications within the system 250 have one or more screens. By combining screens (see Screens), the system 250 can perform permutations to create interconnected screens and generate the required visual, logical, and data elements that comprise each application.

The system 250 may automatically determine the minimum number of screens required to create applications for a given application purpose (see Specify the purpose of an application).

The system 250 may generate a virtual catalog 500(see Virtual catalog) of screens from combining part within the database 252. The system 250 may inspect the virtual catalog 500 and automatically generate new applications for a given purpose without additional input from users.

By analyzing user generated applications for a concrete purpose, the system 250 may determine commonalties across those applications and assess what is the minimum set of screens required to create variations of applications with the given purpose.

The system 250 may automatically determine the maximum number of screens required to create a fully featured application template (see FIG. 6) for a given purpose. By analyzing user generated applications for a concrete purpose, the system can determine what is the commonly acceptable maximum set of screens, required to create variations of applications with the same purpose.

The system 250 may allow users to assign custom alphanumeric tags to components within the database 252 for easy discovery. Within the system 250, users may tag application templates, application instances, screens, parts, elements, resources, resource collections.

Components within the system (see Parts, Screens, Applications, Part dependencies) may be discovered by group name, component name, tags, descriptions, purpose, metadata, related screens, or any other data contained in the system.

The system 250 may use user generated tags to make recommendations of applications templates, screens, parts, elements, resources (see System Intelligence).

The system 250 may capture, store, and analyze users' simple inputs to assign logical meaningful purpose (see Specify the purpose of a screen) to the automatically generated screens. When two or more user generated screens have the same purpose, the system can automatically inspect the virtual catalog and create a subset of screens of the same purpose of the user generated screens.

The system 250 may capture, store, and analyze users' simple input to assign logical meaningful purpose (see Specify the purpose of an application) to the automatically generated applications or application instance. When two or more user generated applications have the same purpose, the system can automatically determine the minimum and maximum number of screens required to create applications of the same purpose, and automatically generate applications of that purpose.

Figure 7:
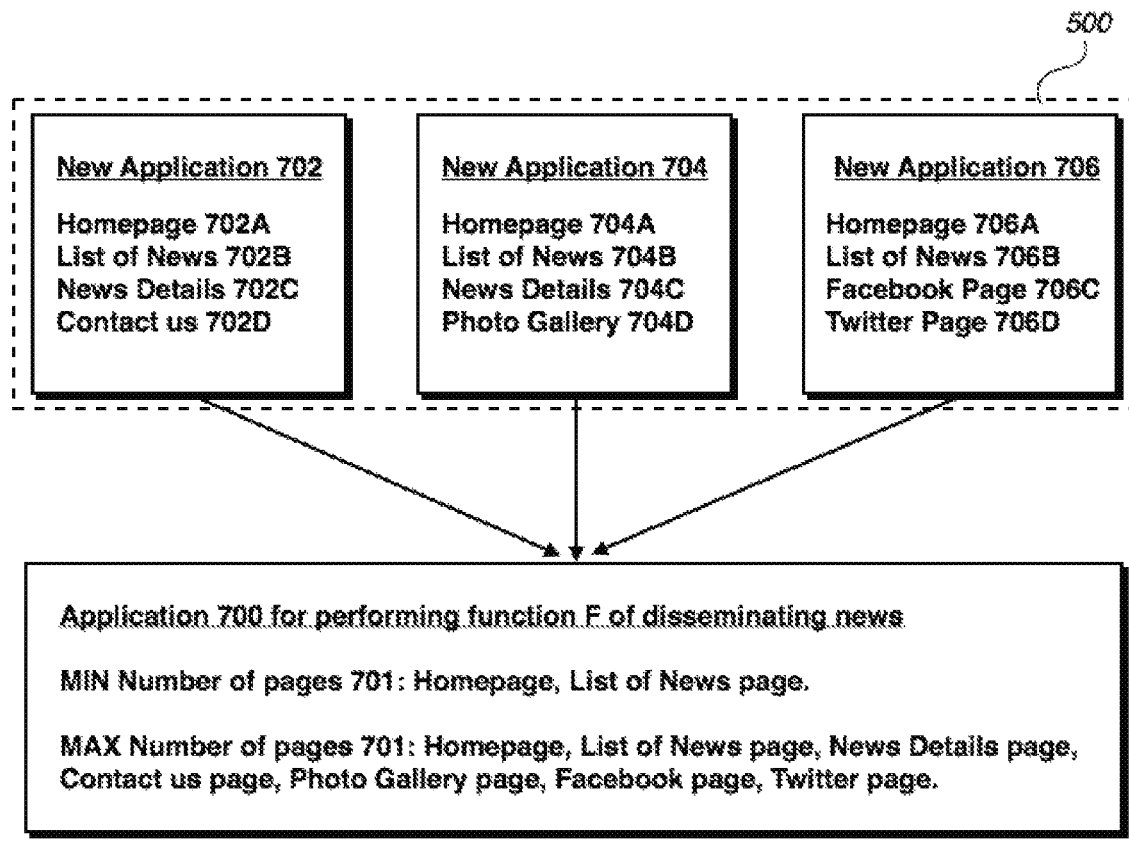
FIG. 7 is a schematic illustrating a method to determine a minimum number and a maximum number of screens in an application being generated, according to an embodiment.

Assume, for example, that a user wishes to generate a new application 700 for the purpose (or function) F of disseminating news. Assume also that the virtual catalog 500 comprises three applications 702, 704, and 706 for this Function F, the pages 701 of which are set forth in FIG. 7. Specifically, application 702 may have four pages 702A, 702B, 702C, and 702D (i.e., a homepage, a page for listing news, a page for news details, and a contact us page, respectively), the application 704 may have four pages 704A, 704B, 704C and 704D (i.e., a homepage, a page for listing news, a page for news details, and a photo gallery page, respectively), and the application 706 may four pages 706A, 706B, 706C, and 706D (i.e., a homepage, a page for listing news, a Facebook page, and a Twitter page, respectively). The system 250 may determine the minimum number (MIN) of pages 701 of the new application 700 by calculating the common pages (i.e., the pages having a common purpose) that are present in each of the applications 702, 704, 706. For example, in this example, the system 250 may determine that the homepage (i.e., pages 702A, 704A and 706A), and the list of news page (i.e., pages 702B, 704B, and 706B) are present in each of the applications 702, 704, 706, and thus, determine that the new application 700 will, at a minimum, have two pages (i.e., a home page and a page for listing news). Similarly, the system 250 may consider the unique pages 701 in the three applications 702, 704 and 706, and compute that the maximum number (MAX) of pages 701 in the new application 700 may be seven pages (i.e., a home page, a page for listing news, a page for news details, a page for contact us, a photo gallery page, a Facebook page, and a Twitter page). As can be appreciated, in determining the maximum number (MAX) of pages 701, the system 250 may not recount the pages having the same purpose (such as the homepages 702A, 704A and 706A).

The system 250 may allow users to created editable instances of screens or applications. Users can modify the concrete values (see Create an application instance) of any screen or application instance.

The system 250 may be capable of organizing, performing searches, and make recommendations of applications (see Applications) and applications screens (see Screens) that have not been yet created. These actions are performed against a subset of the virtual catalog 500 to which the system 250 may assign a purpose based on users' prior inputs.

Further, the system 250 may learn from users' simple inputs about how to identify the purpose of an automatically generated application template, screen, or parts.

The system 250 may aggregate parts and their dependencies to generate application screens, and may aggregate screens into a single interconnected application template. The system 250 may further combine parts into screen, screens into applications, and generate the required files to create an application. Further, the system 250 may host applications in the same computer device where the system is operating. Additionally, in addition to using parts 104 of pre-existing applications, the system 252 may allow users to create new parts 104 (e.g., by providing code for the new parts 104), which may exponentially increase the parts available to users.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for generating a set of ranked screens, the method comprising:
   providing a database of screen seeds and parts, each screen seed being capable of having at least one part positioned on a position thereon;
   selecting a screen seed from said database;
   populating said screen seed with parts from said database;
   assigning said screen a screen purpose; and
   repeating said selecting, populating and assigning to create a set of screens, each of said screens in said set having said screen seed and said screen purpose;
   accessing said set of screens and giving each of said screens in said set of screens a lowest ranking;
   making at least one new screen comprising said screen seed populated with an unused combination of parts previously populated on at least one of said screens in said set of screens;
   associating each of said at least one new screens with said screen purpose;
   increasing said ranking of said screens in said set of screens;
   giving each of said new screens a lowest ranking;
   merging said new screens into said set of screens; and
   storing said set of screens on said database.

2. The method of claim 1 further comprising:
   making a first application, said first application comprising two or more screens from said database; and
   assigning said first application an application purpose.

3. The method of claim 2 further comprising:
   making a second application, said second application comprising two or more screens from said database; and
   assigning said second application said application purpose.

4. The method of claim 3 further comprising:
   if said first application and said second application include any screens with a common screen purpose, creating a minimum screen requirement for said application purpose, said minimum screen requirement comprising all said common screen purposes between said first application and said second application.

5. The method of claim 4 further comprising:
   generating at least one application template for said application purpose, said application template including at least one screen;
   wherein, said application template meets said minimum screen requirement for said application purpose.

6. The method of claim 5 further comprising:
   in response to a user indicating a desire for an application for said application purpose, suggesting to said user at least one of said application templates for said application purpose.

7. The method of claim 6 wherein said application is designed to be rendered on a client device.

8. A non-transitory computer-readable medium having program instructions thereon which, when executed by a processor, perform a method for generating a set of ranked screens comprising:
   providing a database of screen seeds and parts, each screen seed being capable of having at least one part positioned on a position thereon;
   selecting a screen seed from said database;
   populating said screen seed with parts from said database;
   assigning said screen a screen purpose; and
   repeating said selecting, populating and assigning to create a set of screens, each of said screens in said set having said screen seed and said screen purpose;
   accessing said set of screens and giving each of said screens in said set of screens a lowest ranking;
   making at least one new screen comprising said screen seed populated with an unused combination of parts previously populated on at least one of said screens in said set of screens;
   associating each of said at least one new screens with said screen purpose;
   increasing said ranking of said screens in said set of screens;
   giving each of said new screens a lowest ranking;
   merging said new screens into said set of screens; and
   storing said set of screens on said database.

9. The computer-readable medium of claim 8, wherein the method performed when the program instructions are executed by a processor further comprises:
   making a first application, said first application comprising two or more screens from said database; and
   assigning said first application an application purpose.

10. The computer-readable medium of claim 9, wherein the method performed when the program instructions are executed by a processor further comprises:
    making a second application, said second application comprising two or more screens from said database; and
    assigning said second application said application purpose.

11. The computer-readable medium of claim 10, wherein the method performed when the program instructions are executed by a processor further comprises:
    if said first application and said second application include any screens with a common screen purpose, creating a minimum screen requirement for said application purpose, said minimum screen requirement comprising all said common screen purposes between said first application and said second application.

12. The computer-readable medium of claim 11, wherein the method performed when the program instructions are executed by a processor further comprises:
    generating at least one application template for said application purpose, said application template including at least one screen;
    wherein, said application template meets said minimum screen requirement for said application purpose.

13. The computer-readable medium of claim 12, wherein the method performed when the program instructions are executed by a processor further comprises:

in response to a user indicating a desire for an application for said application purpose, suggesting to said user at least one of said application templates for said application purpose.

14. The computer-readable medium of claim 13, wherein said application is designed to be rendered on a client device.

\* \* \* \* \*